UNITED STATES PATENT OFFICE.

JOSEPH ELLSWORTH ZILK, OF PITTSBURGH, PENNSYLVANIA, ASSIGNOR TO ODORLESS FERTILIZER MANUFACTURING COMPANY, OF PITTSBURGH, PENNSYLVANIA, A CORPORATION OF DELAWARE.

PROCESS OF MAKING FERTILIZER.

1,247,059.　　　　Specification of Letters Patent.　　Patented Nov. 20, 1917.

No Drawing. Original application filed November 11, 1916, Serial No. 130,835. Divided and this application filed February 10, 1917. Serial No. 147,887.

*To all whom it may concern:*

Be it known that I, JOSEPH E. ZILK, a citizen of the United States, residing at Pittsburgh, in the county of Allegheny and State of Pennsylvania, have invented new and useful Improvements in Processes of Making Fertilizer, of which the following is a specification.

The present invention relates to the production of phosphatic fertilizers from phosphate rock, by an improvement in that class of processes in which the phosphate rock is heated with other materials.

The process of the present invention comprises heating phosphate rock with limestone in the presence of coke and a suitable flux, the entire material being heated preferably being introduced into the upper end of a rotary kiln, and being heated therein until a particular physical condition is produced in the mass, by virtue of which the product is readily ground or pulverized, and in which a considerable proportion of the phosphoric acid is in a condition in which it is available as plant food.

The present case is a division of my prior application 130,835, filed November 11, 1916.

In carrying out the process of the present application I may proceed as follows:

I take 2000 pounds of crude phosphate rock, containing about 30% of phosphoric anhydrid ($P_2O_5$), pulverize the same in a suitable mill, so that about 80% of it will pass a screen having 100 meshes per linear inch. To this I then add about 200 to 300 pounds (preferably about 300) of ground limestone, about 200 to 300 of ground coke and about 400 pounds of niter cake.

The material is then thoroughly mixed, and preferably moistened with water sufficiently to form a paste. This is then introduced into a kiln which may be an ordinary rotary cement kiln and heated therein to a temperature of from 1300 to 1700° F. The material should be maintained in the kiln at this high temperature for a considerable time, say 75 to 90 minutes. Care should be taken, however, not to very much exceed this temperature, since at the higher temperatures, a hard clinker would be produced, which would be difficult to grind, and which would also not contain as high a percentage of available phosphoric acid as that produced by the preferred temperature above stated. The kiln may be heated with any kind of suitable fuel, for example coal dust, gas or fuel oil. The heating is effected in the manner commonly employed in cement kilns, namely by introducing a blast of fuel and air into the lower end of the kiln.

During the heating operation, and continuing perhaps even after the material has left the zone of highest temperature in the kiln, the coke dust itself burns and thereby aids in the production of a light, porous, readily crushed mass of rounded nodules, in which there is a considerable proportion of the phosphoric acid available. The nodules should leave the furnace in the condition above stated, and care should be exercised not to overheat the mass, which would produce hard, completely clinkered nodules.

I am aware that various mixtures of phosphate rock and similar material have been heated to high temperatures, temperatures around 2,000 to 2,700° F. having been previously suggested. I have found that the heating for a considerable time, at a temperature too low to produce a hard clinker, but high enough to produce a semi-clinkering of the mass, with the production of soft nodules, and the maintaining of this temperature for a considerable time, enables me to produce products having the valuable qualities above referred to.

What I claim is:

1. The process of making a fertilizer material which comprises producing an intimate mixture of phosphate rock, coke, limestone and niter cake, and heating the mixture, under conditions capable of producing the combustion of said coke, to a temperature sufficient to convert the mass into readily crushed nodules, while avoiding such high temperatures as would produce complete clinkering of the mass.

2. A process of making a phosphatic fertilizer which comprises heating only to incipient clinkering, an intimate mixture of Phosphate rock _____ about 2000 lbs.
Coke _____ "  200 to 300 lbs.
Pulverized limestone __ "  200 to 300 lbs.
Niter cake _____ "  400 lbs.

and thereafter grinding the mass.

3. The process of making a fertilizer material which comprises producing an intimate mixture of phosphate rock, coke, limestone and a salt of an alkali metal, and heating the mixture, under conditions capable of producing the combustion of said coke, to a temperature sufficient to convert the mass into readily crushed nodules, while avoiding such high temperatures as would produce complete clinkering of the mass.

In testimony whereof I affix my signature.

JOSEPH ELLSWORTH ZILK.